United States Patent [19]

Anderson et al.

[11] 4,045,782
[45] Aug. 30, 1977

[54] MICROPROGRAMMED PROCESSOR SYSTEM HAVING EXTERNAL MEMORY

[75] Inventors: Terry M. Anderson, Minnetonka; Reinhard Schumann, St. Paul, both of Minn.

[73] Assignee: The Warner & Swasey Company, Cleveland, Ohio

[21] Appl. No.: 671,730

[22] Filed: Mar. 29, 1976

[51] Int. Cl.[2] .......................... G06F 9/16; G06F 13/00
[52] U.S. Cl. ................................................. 364/200
[58] Field of Search ........................ 340/172.5; 445/1

[56] References Cited
U.S. PATENT DOCUMENTS

| | | | |
|---|---|---|---|
| 3,900,835 | 8/1975 | Bell et al. | 340/172.5 |
| 3,938,098 | 2/1976 | Garlic | 340/172.5 |

*Primary Examiner*—Melvin B. Chapnick
*Attorney, Agent, or Firm*—Alfred L. Patmore; T. Thomas Von Pechy

[57] ABSTRACT

A data processing system including a central processing unit and external memory. The central processing unit has an arithmetic logic unit having first and second inputs and an output for outputting data. The arithmetic logic unit inputs are selectively connected to the outputs of a plurality of addressable registers which registers have inputs connectable to the arithmetic logic unit output for receiving and storing data therefrom. Additionally, the central processing unit has a read only memory capable of storing a plurality of addressable control instructions and having a plurality of outputs for supplying control signals in dependence upon the addressed control instructions and means capable of addressing control instructions stored in the read only memory in a predetermined sequence, or addressing a selected one of said word locations in dependence upon the data outputted from the arithmetic logic unit. The central processing unit, additionally, has a means for carrying signals adapted to be applied to the external memory for addressing the external memory and for storing data therein.

13 Claims, 4 Drawing Figures

MICROPROGRAMMED PROCESSOR SYSTEM HAVING EXTERNAL MEMORY

BACKGROUND OF THE INVENTION

The present invention deals with an electronic data processing system of the type known in the art as a microprogrammed processor wherein a plurality of macroinstructions are stored in an addressable memory. In this type of system these macroinstructions are typically executed by a central processing unit which is controlled by a plurality of microinstructions similarly stored in an addressable memory.

In a microinstruction controlled data processing system of the type described herein the central processing unit typically contains an arithmetic logic unit for performing arithmetic and logical operations on data necessary to execute the various macroinstructions. The results of these arithmetic and logical operations must be stored for use in subsequent arithmetic and logical operations by the arithmetic logic unit. For example, one of the microinstructions used in executing a given macroinstruction may cause the arithmetic logic unit to output a result which will be temporarily stored and later retrieved to be operated on by the arithmetic logic unit under the control of a subsequent microinstruction. Typically, the storage means used for these results consists of a number of dedicated storage registers each of such registers being dedicated to the storage of a particular result and arranged to each be accessible to only one operand input of the arithmetic logic unit, and a general register or plurality of addressable general registers for storing those results for which there are no dedicated registers. It would be desirable in a data processing system of this type to minimize the number of dedicated storage registers required in the central processing unit and to make a plurality of addressable general registers accessible to each operand input of the arithmetic logic unit. It is also desirable in a system of this type to have the capability of directly addressing the general registers by way of microinstructions or by way of an address computed by the arithmetic logic unit. Further, it is desirable in a system of this type to have an interim data storage register independent of the general registers capable of storing a result outputted by the arithmetic logic unit.

Microprogrammed data processing systems are frequently used for conrolling myriad external devices having differing real time control information requirements. Therefore, in many such systems, priority levels are assigned to the macroprogram sub-routines used for controlling various external devices, higher priority levels being assigned to those devices requiring shorter response times from the data processing system and lower priority levels being assigned to the devices where response time is less critical. In such systems dedicated hardware is typically included in the central processing unit which enables external devices needing control information to interrupt the execution of lower priority level macroinstruction sub-routines. Since it is desirable in small data processing systems to minimize hardware within the central processing unit, it would be desirable in such a system to have interrupts controlled by hardware not dedicated to that purpose but rather by the general purpose hardware already available.

Data processing systems are typically arranged to handle multibit binary data words consisting of a particular number of data bits, that is, the various buses for carrying data and the various registers and the other elements comprising the microprocessor system are arranged to handle a particular number of data bits. In order to minimize the use of dedicated hardware for addressing memory location, such addressing is frequently carried out using multibit binary data words consisting of the same number of data bits as other binary data words used in the system, thus limiting the number of addressable word locations in memory. It would be desirable therefore, to have in a processor system having a small word size memory, addressing means capable of addressing a number of word locations which is larger than the largest possible number which can be represented by the binary data word size chosen for the processor.

SUMMARY OF THE INVENTION

The present invention presents a data processing system having a central processing unit and an external memory. The central processing unit includes an arithmetic logic unit having first and second inputs for receiving input data from a plurality of addressable registers each of such registers having an input connected to the output of the arithmetic logic unit for receiving and storing data therefrom. The central processing unit further includes a means for selectively connecting the output of one of the plurality of registers to each of the first and second inputs of the arithmetic logic unit. The central processing unit also includes a read only memory having a plurality of addressable word locations each storing a control instruction and a plurality of outputs for supplying control signals in dependence upon the addressed control instruction. The central processing unit includes a means for carrying signals to the external memory for addressing word locations therein and storing data in addressed word locations. The central processing unit, additionally, includes a means for addressing read only memory word locations either in a predetermined sequence or addressing a selected one of the word locations in dependence upon data outputted from the arithmetic logic unit.

In a more limited embodiment of this invention, the plurality of registers includes a first group of registers and a second group of registers, and a file address register having an input connected to the output of the arithmetic logic unit for storing data received therefrom and having an output connected to the second group of registers for addressing a selected register therein in dependence upon data received from the arithmetic logic unit.

In another embodiment of this invention, the first group of registers includes an interrupt mask register for storing a binary number representative of those interrupt priority levels for which interrupts can be enabled, an active level register for storing a binary number representative of the priority level in which the system is operating as well as those lower priority levels which have previously been interrupted and to which the central processing unit must return upon completion of its operation at the next higher priority level, and an interrupt test mask register for storing a binary number representative of those interrupt priority levels which are both of a higher priority level than the level in which the central processing unit is operating and are levels for which interrupts shall be enabled.

In still another embodiment of this invention, the means for carrying signals to said external memory includes an output data bus connected to the output of the arithmetic logic unit and to the external memory for carrying data outputted by the arithmetic logic unit to the external memory and a command function bus driver with an input connected to the read only memory and an output connected to the external memory for transmitting a plurality of binary coded function commands thereto.

DESCRIPTION OF THE PREFERRED EMBODIMENT

Following is a detailed description of one preferred embodiment of this invention. This preferred embodiment presents a data processor with a relatively simple architecture and a minimal amount of hardware. The central processing unit (CPU) has read only memory storage for up to five hundred twelve micro control instructions allowing for a macroinstruction set which includes a full range of arithmetic and logical operations. This preferred embodiment also includes a memory external to the CPU for storing the set of macroinstructions which are executed in the CPU by microinstructions. If the external memory, or a portion thereof, comprises a read/write memory (RWM) it may also be used for storage of data outputted from the CPU.

Figure 1:
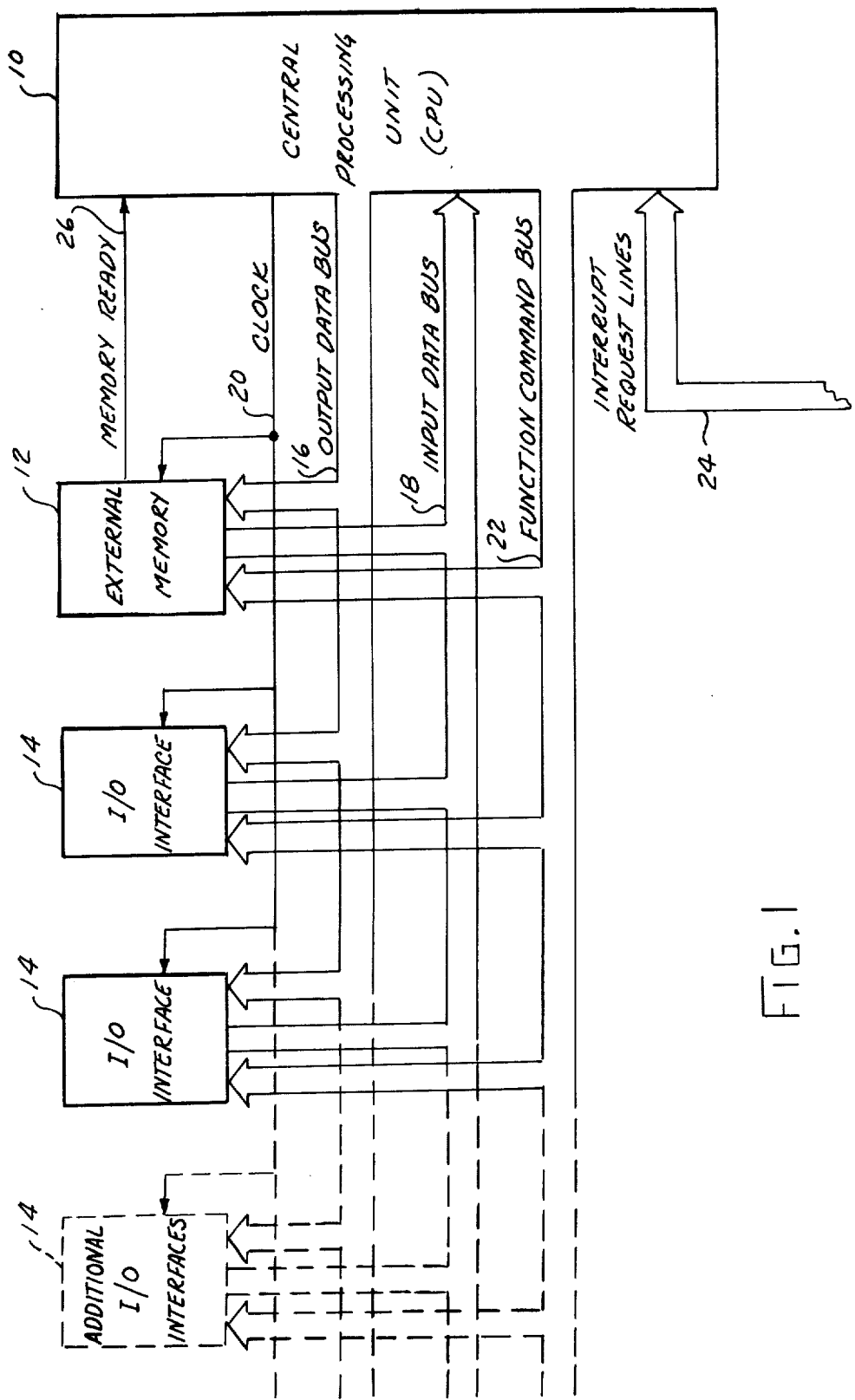
FIG. 1 is a block diagram showing the interconnection of the central processing unit, the external memory and the input/output interfaces in the preferred embodiment of this invention.

Referring to FIG. 1, there is shown the general configuration of a processor system according to the preferred embodiment of this invention. The CPU 10 performs arithmetic and logical operations dictated by the microinstruction set which is stored therein for executing macroinstructions received from the external memory 12. The input-output (I/O) interfaces 14 are employed to electrically interface the system with a plurality of input-output ports to which myriad devices may be connected. For example, in cases where the microprocessor is employed for the purpose of machine control, I/O ports might be connected to relays or solenoids or other such devices, and in other applications the I/O ports might be connect to data processing oriented devices such as printers or disc memories. The CPU is connected to external devices, i.e., the external memory and the I/O interfaces, by way of a plurality of data and control buses. All information outputted by the CPU is passed to the external devices by way of the output data bus 16 regardless of whether this information is an address, data to be stored in the external memory, or data to be transmsitted to one of the I/O interfaces. Similarly, macroinstructions and data stored in the external memory are passed to the CPU by way of the input data bus 18, as is data from the I/O interfaces; in this preferred embodiment the output data bus 16 as well as the input data bus 18 are eight bit buses. The clock line 20 is necessary for synchronization of the external memory and the I/O interface with the central processing unit. The function command bus 22 is a three bit bus for sending eight different function commands from the CPU to the external memory and the I/O interface. These commands consist of a first memory address command (CMA1), a second memory address command (CMA2), a memory read command (CMRE), a memory write command (CMWS), an I/O interface address command (IOA), an I/O interface read command (IOR), and an I/O interface write command (CIOW). The eighth possible command is all three digits being binary zero and is indicative of no command to any of the external devices. The eight interrupt request lines 24 also feed CPU 10 as will be discussed in detail hereinafter.

In this preferred embodiment the external memory is capable of receiving a 16-bit address, 8 bits at a time, over the output data bus 16, thus allowing a memory storage capability of up to 65,536 eight bit data words. In order to read a macroinstruction or other data stored in a given external memory word location, that location must be first addressed. In order to do so, the central processing unit will simultaneously send out over the output data bus 16 the eight least significant bits of the memory address location and send out over the function command bus 22 a coded first memory address command (CMA1). This coded function command will be decoded by the external memory causing it to recognize the eight least significant bits of the memory address. Immediately thereafter, the central processing unit will similarly send out the remaining eight bits of the memory address over the output data bus 16 and a coded second memory address command (CMA2) over the function command bus 22, which command will be decoded by the external memory causing it to recognize the remaining eight bits of memory address. Since the external memory requires a finite time period to internally address the location represented by the 16-bit memory address, a memory ready line 26 is employed to indicate to the central processing unit when addressing is complete within the memory and the memory is capable of outputting the data previously stored therein. Once the memory ready signal has been received by the CPU, it may read the macroinstruction or other data stored in the addressed memory location by sending out over the function command bus a coded memory read command (CMRE) which command will be decoded by the memory causing it to output over the input data bus 18 the data stored in the addressed memory location. The central processing unit may store data in the addressed memory location by simultaneously sending out over the output data bus 16 the data to be stored in the memory and sending out over the command function bus 22 a memory write command (CMWS). If a macroinstruction being executed by the central processing unit requires data to be read in or out of an I/O port connected to one of the I/O interfaces, the central processing unit must first address the I/O port in question. An 8 bit I/O address is used thus accomodating up to 256 different I/O ports, each I/O port being capable of inputting or outputting an eight bit binary data word. In order to address an I/O port the central processing unit sends an 8 bit address over the output data bus 16. Simultaneously, the CPU sends a coded I/O address command (CIOA) over the function command bus 22. The I/O interfaces will decode this command and prepare to read information out from or write information into the addressed I/O port. If information is to be transmitted to the central processing unit, the central processing unit sends a coded I/O read command (CIOR) and the interface transmits the 8 bits of binary data present on the addressed I/O port to the central processing unit via input data bus 18. In the event that data is to be transmitted to the addressed I/O port, the central processing unit sends a coded I/O write command (CIOW) simultaneously to the I/O interfaces. The 8 bits of binary data outputted by the CPU on the output data bus 16 will be received by the addressed I/O port.

THE CENTRAL PROCESSING UNIT

Figure 2:
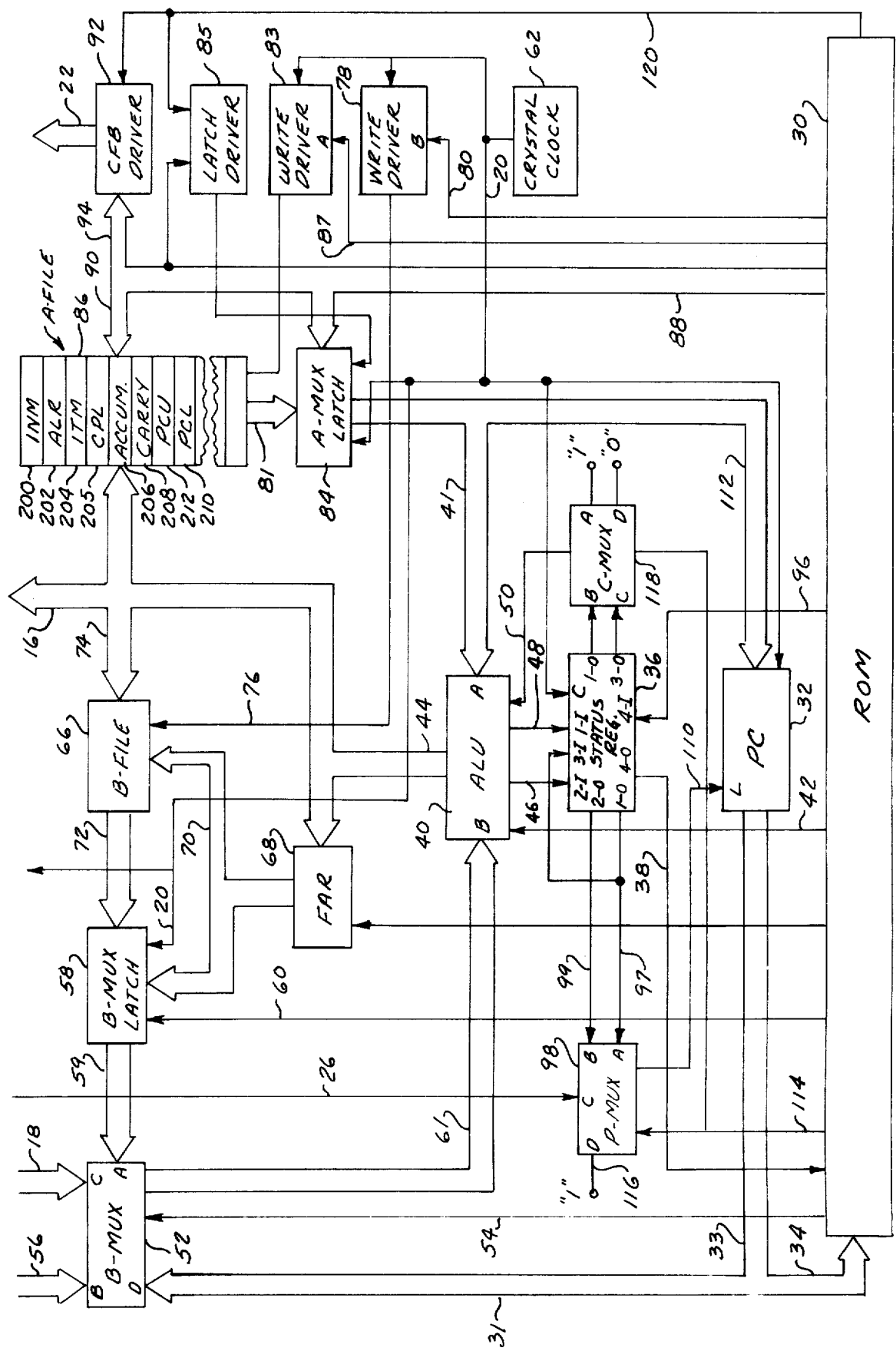
FIG. 2 is a detailed schematic diagram of the central processing unit according to the preferred embodiment.

Referring to FIG. 2, the central processing unit is shown schematically. Microinstructions controlling the central processing unit are stored in the read only memory (ROM) 30. The ROM has the capability of storing up to 512, 24- bit binary data word microinstructions, thereby necessitating a nine bit ROM address. The ROM is addressed by an 8 bit address generated by the program counter (PC) 32 passed to th ROM by lines 33 and 34, and a ninth address bit stored in the status register 36, passed by line 38. The microinstructions stored in an addressed word location in the ROM are outputted in the form of control signals on the various ROM output data lines, which carry the ROM instruction control signals to various other elements in the central processing unit.

The arithmetic logic unit (ALU) 40 performs the various arithmetic and logical operations on data necessary to execute the macroinstructions. The ALU 40 is controlled by the 5 bit ROM output line 42 thus enabling it to carry out up to 32 possible arithmetic and logical operations on the operands presented at the A and B inputs. The operations that can be performed by the ALU include adding, subtracting, incrementing, decrementing, logical AND, logical OR, exclusive OR, or passing through either operand unchanged. The result of ALU operations is outputted on the eight bit ALU output line 44. Additionally, the single bit ALU output line 46 will output a logical zero in the event the result outputted on output line 44 is not hexadecimal FF, i.e., all logic ones. The logical one or zero binary carry bit resulting from an arithmetic operation will be outputted on the single bit ALU output line 48. The ALU also has a single bit carry input connected to input line 50 for selectively inputting a carry bit generated during a previous arithmetic operation. In this preferred embodiment, like other elements of the CPU, the ALU has an eight bit capacity, therefore, the carry output and carry input are necessary for arithmetically operating on binary numbers having more than 8 bits.

The arithmetic logic unit receives its B operand input from the B multiplexer (B-mux) 52 which is controlled by the two bit ROM output line 54 to selecteively output the data presented on one of its four eight bit inputs. These inputs include the data input bus 18 which inputs data to the CPU from the external read/write memory and the I/O interfaces, the 8 bit ROM address generated by the program counter 32, the seven interrupt request lines, and a single halt line 56, and the data outputted on line 59 by the B multiplexer latch (B-mux latch) 58.

The B-mux latch 58 is a multiplexing means with latching capabilities which will input the data on one of its two inputs in dependence upon single bit ROM output line 60 and, on receiving the negative going edge of each clock pulse from crystal clock 62 by way of clock line 20, will latch the data present on the input selected by ROM output line 60 and will output the latched data. The B-mux latch 58 receives its input from one of two places, the B file 66 or the file address register (FAR) 68.

The B file 66 comprises in this preferred embodiment an addressable file of 8 bit parallel in - parallel out temporary data storage registers, the file preferably containing sixteen such registers, and may comprise a random access memory. A given data storage location, i.e. register in the B file, is addressed by way of the four bit B file address line 70 which is connected to the four least significant bits of the eight bit output of the file address register 68. When a given register in the B file is addressed the data stored in that register will be outputted on the B file output line 72 to the selective connecting means made up of the B-mux latch 58 and the B-mux 52 which can selectively pass data outputted by an addressed B file register to the B input of the ALU. Data present on the B file input line 74 can be written into an addressed register in the B file by a write command on line 76, which write command is generated by write driver 78 when commanded to do so by the single bit ROM output line 80. The writer driver is synchronized with the crystal clock in such a manner that the microinstruction outputted by the ROM during one clock cycle may be used both to read from the B file, and after data is latched in the B-mux latch 58, to write data present on B file input line 74 into the addressed register in the B-file.

The file address register 68 receives as its input the 8 bit data word outputted by the ALU 40 on line 44 and stores this data when commanded to do so by single bit ROM control line 82. The file address register serves a dual purpose in that it may be used either to address a register in the B-file, the address having been outputted by the arithmetic logic unit and stored in the file address register, or it may be used as an interim data storage register for temporarily storing data outputted by the arithmetic logic unit when such data is subsequently to be used as an operand input to the arithmetic logic unit. For example, during the execution of a first microinstruction an arithmetic operation might be performed by the arithmetic logic unit and the result stored in the file address register, and during a subsequent microinstruction this result may be passed from the file address register through the B-mux latch 58 and through the B multiplexer 52 to the arithmetic logic unit B operand input to be operated on by the arithmetic logic unit.

The A operand input of the ALU 40 receives data from the A multiplexer latch (A-mux latch) 84 which is very similar in operation to the B multiplexer latch 58 in that it receives data from one of two inputs chosen by the microinstruction and latches or stores the data upon receiving the negative edge of a clock pulse from the crystal clock 62. The A-mux latch is controlled by the A-mux latch driver 85 to receive and latch information from either an addressed register in the A file 86 via output line 81 or from ROM output line 88; the latch driver is controlled by a single bit ROM output line 120 and one of the eight control lines making up ROM output line 88. The information on ROM output line 88 consists of eight bits of an addressed microinstruction stored in the ROM.

The A file 86 is very similar to the B file 66. It is an addressable file of eight bit data storage registers and may comprise a random access memory; like the B file, an addressed register in the A file receives and stores data outputted on the ALU output 44. Also information stored in an addressed register in the A file may be passed to an operand input of the ALU 40 via the selective connecting means made up of the A-mux latch 84. The A file is commanded to store inputted information by the A write driver 83 which, like the B writer driver, is controlled by a ROM outputted control signal, ROM output line 87, and is synchronized with the crystal clock 62. The primary difference between the A file and the B file is that the A file is not addressed by a register receiving an address from the ALU output 44, but rather is addressed directly by ROM outputted control signals resulting from the microinstructions. Also, information stored in the A file may be inputted only to the A operand input of the ALU 40 whereas information stored in the B-file may be inputted only to the B operand input. Four of the eight data bits making up the ROM output line 88 are connected to the A-file via line 90 for addressing registers in the A-file.

The ALU output 44 is also connected to the address and data output bus 16.

From the description to this point, it can be seen that the CPU is configured in such a manner as to make the ALU 40 the central element in which all arithmetic and logical operations are performed on various data and through which data passes when being moved from one element to another; for example, if data stored in either the ALU or B-files is to be outputted on the address and data output bus it must pass through the ALU. Additionally, data coming into the central processing unit from the external read/write memory, or from external devices by way of one of the I/O interfaces, is passed directly to the ALU to be arithmetically operated on thereby or to be passed through the ALU for storage in one of the various registers in the A and B files. The use of the A-file and B-file as configured herein allows both inputs of the ALU access to a group of general registers, and the provision of two means for addressing the general register file, i.e., addressing the B-file by way of an address calculated by the ALU and addressing the A-file directly with the microinstructions, allows a great deal of flexibility in microprogramming due to the absence of dedicated registers. At the same time, through the use of microinstructions, registers in the A-file may effectively be used as dedicated registers in a given application.

As mentioned previously, ROM 30 preferably stores up to 512 microinstructions requiring nine address bits to distinguish them. The ROM comprises two 256 microinstruction sections. The 8 bit ROM address generated by the program counter (PC) 32 is capable of addressing the microinstruction word locations in one 256 bit section of the ROM at a time. When a given ROM location is addressed, the microinstruction stored in that location will be outputted in the form of control signals on the various ROM output lines. The microinstruction control signal outputted on single bit ROM output line 96 determines which 256 bit section of the ROM will be addressed to output the next microinstruction.

The PC 32 has two modes of operation, incremental and specific address, also referred to as first and second modes, respectively. In the incremental mode, the PC operates as a binary up-counter, incrementing by one at the positive edge of each clock pulse on clock line 20, counting from 0 to 255. Each time the PC is incremented the next address location in the ROM will be addressed, and the next microinstruction will be outputted on the various ROM output lines in the form of control signals. The logical sense of the signal on ROM output line 96 will be stored at the end of each clock cycle in the status register 36. The program counter will then be incremented to the address of the next microinstruction, which when combined with the signal in the status register provides the next nine bit address to ROM 30 via lines 34 and 38, respectively.

P multiplexer (P-mux) 98 acts as a mode control means and determines whether PC 32 will continue operating in its incremental mode or will be actuated to its specific address mode of operation. If a logical true signal is outputted by P-mux 98 to PC 32 by way of single bit line 110, the PC will be actuated from the incremental mode to the specific address mode causing the PC to be set to the count represented by the eight bit binary information present on the output of the A multiplexer latch 84 connected to the PC by way of data line 112 at the positive edge of the next clock pulse on clock line 20.

The various microinstructions stored in the ROM are arranged in groups; the microinstruction making up a given group are normally addressed in sequence to perform a fixed sequence of operations.

Actuating the PC 32 from the incremental mode to the specific address mode is done in order to jump from one group of microinstructions to another. Once the specific address is loaded into the PC it will thereafter operate in the incremental mode sequentially addressing microinstructions in ROM beginning with the specific address loaded therein, which specific address is typically the address of the first microinstruction of another group of microinstructions. Jumps of this type may be unconditional, or they may be conditioned on the result of a previous computation. In this preferred embodiment, four different types of such jumps are possible in dependence upon the microinstruction control signals outputted on the three bit ROM output line 114. These four types of jumps are an unconditional jump and three types of conditional jumps. The P-mux can be controlled by the microinstruction control signals on ROM output 114 to output a logical false signal regardless of the logical sense of the signals on its inputs, thereby causing the PC 32 to remain in the incremental mode, or it may be selectively controlled to output the logical sense of the signal presented on any one of its inputs. The D input to the P-mux is connected to a source 116 of a continuous logical true signal; therefore, if the microinstruction control signals on ROM output line 114 command the P-mux to output the signal presented on its D input, the PC 32 will unconditionally be activated to the specific address mode and will jump to the specific address inputted thereto on line 112. The C input to the P-mux is connected to the memory ready line 26 which indicates, after an external memory address has been sent out, when the memory is ready to have data read out from the addressed location therein. When the microinstruction control signals command the P-mux to output the signal present on the memory ready line 26 a microprogram counter jump will be conditioned upon the logical sense of the memory ready signal, i.e., a microprogram counter jump will occur if the memory ready line indicates that the external read/write memory is not yet ready to output data stored in the location addressed. For example, this type of conditional jump is frequently used when the external memory has been addressed and the central processing unit is waiting for a memory ready indication, in order that it may read information out of the external read/write memory. In this case, microinstruction will output its own address over ROM output line 88, the A-mux latch 84 will be commanded to output the information presented thereto by ROM output line 88 and the P-mux 98 will be commanded to output the logical sense of the signal on the memory ready line. The program counter will then be caused to continuously jump to the address of the present microinstruction until such time as the memory ready line 26 indicates a memory ready condition and allows the program counter to shift back to the incremental mode and move to the next microinstruction in order to read in such information from the external memory.

The other two types of conditional jumps are conditioned upon specific results of ALU operation during the previous microinstruction. The status register 36 stores the data presented on all four of its inputs during the given clock cycle, i.e., during the time a given microinstruction is being executed, and outputs this information on its four outputs during the subsequent clock cycle when the next microinstruction is being executed. Information inputted on the 1-I input of the status register is subsequently outputted on the 1-O thereof; similarly, data presented on the 2-I, 3-I, and 4-I inputs is subsequently outputted on the 2-O, 3-O, and 4-O outputs, respectively. The ALU output line 46 outputs a signal which indicates whether the result of the ALU operation outputted on line 44 is a hexadecimal FF, i.e., all logical ones, and the signal outputted on ALU output line 48 indicates whether or not the ALU operation resulted in a binary one carry bit. The signals on both line 46 and line 48 are stored in the status register. During the next microinstruction, if the P-mux is commanded to input the information on its A input the information outputted on the 1-O output of the status register which is connected to the A input of the P-mux via line 97 will be passed by the P-mux 98 to the program counter (PC) 32 and a program counter jump will be conditioned upon whether or not a carry bit was outputted by the ALU during the previous microinstruction. Similarly, if the P-mux is commanded to input the information on its B input the information outputted on the 2-O output of the status register will be passed to the program counter via line 99 and a jump will be conditioned upon whether or not the result outputted by the ALU on line 46 to status register 36 and stored therein during the previous microinstruction was a hexadecimal FF.

It is possible, when executing a jump, to store in the A-file the address of the microinstruction commanding the jump in order that the central processing unit may return to the following microinstruction later. The microinstruction address outputted by the PC 32 is passed to the B-mux 52 via lines 33 and 31. This address may be stored in the A-file by addressing a chosen register therein via ROM output line 88, commanding the B-mux to output to the ALU via line 61 the ROM address present on line 31, commanding the ALU to output this address unchanged on line 44 and commanding the A file to store the address in the chosen register therein. The address thus saved can be incremented during a subsequent cycle and then loaded back into the PC 32 by selecting the save register output through A-mux latch 84 and selecting an unconditional jump as previously described.

The carry feature of the ALU 40 is controlled by the C-multiplexer (C-mux) 118. The C-multiplexer output is connected to the carry input of the ALU via single bit line 50 and the C-mux 118 is controlled by ROM output line 114 to output the logical sense of the signal presented on one of its four inputs. The A input to the C-mux is connected to a continuous source of a logic one signal and the D input is connected to a continuous source of a logic zero signal, therefore, if the C-mux is commanded to output the signal presented on the A input thereof a carry one will be forced on the ALU carry input and the eight bit binary number outputted by the ALU will be incremented by one, assuming an arithmetic operating mode of the ALU has been selected; similarly, if the C-mux 118 is commanded to output the signal presented on its D input a carry zero will be forced on the carry input of the ALU having no effect on the 8 bit binary number outputted thereby. The B and C inputs to the C-mux 118 are used to select the ALU carry output from either of the two immediately preceding microinstructions. For example, in this preferred embodiment, the A-file and the B-file registers are capable of storing eight bit data words. If a 16 bit binary number were to be operated on by the system, it would have to be stored in two registers in either the A-file or the B-file. If such a 16 bit number stored in the A-file were to be incremented by one, a first microinstruction would be addressed which would cause the ROM to output control signals for: addressing the register in the A-file storing the eight least significant bits of the 16 bit binary number, commanding the A-mux latch 84 to receive the data stored in that addressed register and output the data to the A input of the ALU 40, and commanding the C-mux 118 to output the logical one on the ALU carry input and incrementing the eight least significant bits of the 16 bit binary number by one. The logical one, or logical zero, carry bit resulting from incrementing the eight least significant bits would be outputted by the carry output of the ALU and passed to the status register 1-I input via line 48 where such carry bit would be stored. The first microinstruction would additionally cause ROM output line 87 to output a control signal for commanding the A file to write into the addressed register the eight bit data word outputted by the ALU on 44, which data word would consist of the eight bit data word read out from that register incremented by one. During the next clock cycle a second microinstruction would be addressed which would cause the ROM to output control signals which would address the register in the A file containing the eight most significant bits of the 16 bit binary number, command the A-mux latch 84 to output the contents of that register (which would then be inputted to the ALU A operand input), command the C-mux 118 to output the information presented on its B input (which input is connected to the 1-O output of the status register which outputs the carry bit outputted by the ALU and stored in the status register during the previous cycle), command the ALU 40 to combine this carry bit with the eight most significant bits of the 16 bit binary number and output the result, and command the A file to store the result in the addressed register. A slightly different handling of the carry bit is necessary when a binary number stored by the B-file is to be operated on by the ALU. In such a case, if, for example, a 16 bit binary number were to be incremented by one, a first microinstruction would cause the ROM to output control signals which would cause the ALU to output the address of the register in the B file storing the eight least significant bits of the 16 bit binary number and would command the FAR 68 to store this address, which would then be outputted by the FAR 68 via line 70 thereby addressing the B file register. During the next clock cycle, a second microinstruction would be addressed causing the ROM to output control signals which would command B-mux latch 58 to output the contents of the addressed register in the B file 66, command B-mux 52 to output the data received from the B-mux latch 58, command the ALU to increment by one the eight least significant bits of the 16 bit binary number and output the result on the output line 44 and command the B file to store the results in the addressed register via the B file input line 74. The logic one or logic zero carry bit resulting from this operation would be outputted by the ALU on line 48 stored on the 1-I input of the status register 36. During the next clock cycle, a second microinstruction would be addressed for causing the ROM to output control signals which would command the ALU to output the address of the register in the B file containing the eight most significant bits of the sixteen bit binary number, and would command the FAR 68 to store and output the address. During this second clock cycle, the carry bit resulting from operation on the eight least significant bits of the 16 bit binary number would be outputted on the 1-O output of the status register, which is fed to the 3-I input thereof where it will be stored. A third microinstruction would then be addressed which would cause the ROM to output control signals to: command the B-mux latch 58 and the B-mux 52 to pass the eight most significant bits of the 16 bit binary number to the B operand input of the ALU, command the C-mux 118 to output the data received on its C input from the 3-O output of the status register, command the ALU to combine the data received from the C-mux with the eight most significant bits of the 16 bit binary number and command the B file to store the result in the addressed register. The carry bit was outputted by the ALU during execution of the first microinstruction, stored in the bit latch associated with the 1-I input of the status register, outputted on the 1-O output thereof and stored in the bit latch associated with the 3-I input during execution of the second microinstruction and outputted on the 3-O output to the C-mux to be sent to the ALU during execution of the third microinstruction. This manner of handling the carry bit effects a one cycle delay between the time the carry bit is outputted by the ALU and the time it is inputted to the carry input thereof, thus allowing a cycle in which to address the B file.

Function commands sent by the central processing unit to the external read/write memory and the I/O interfaces, by way of the function command bus 22, are generated by the function command bus driver (CFB driver) 92. The CFB driver receives a 3 bit coded function command, to be sent out over the function command bus, from the ROM by way of the 3 bit data line 94 which is connected to three bits of the eight bit ROM output line 88. The CFB driver 92 is controlled by single bit ROM output line 120 to either send out no function command or to send out the data presented on its input by data line 94.

EXTERNAL MEMORY

Figure 3:
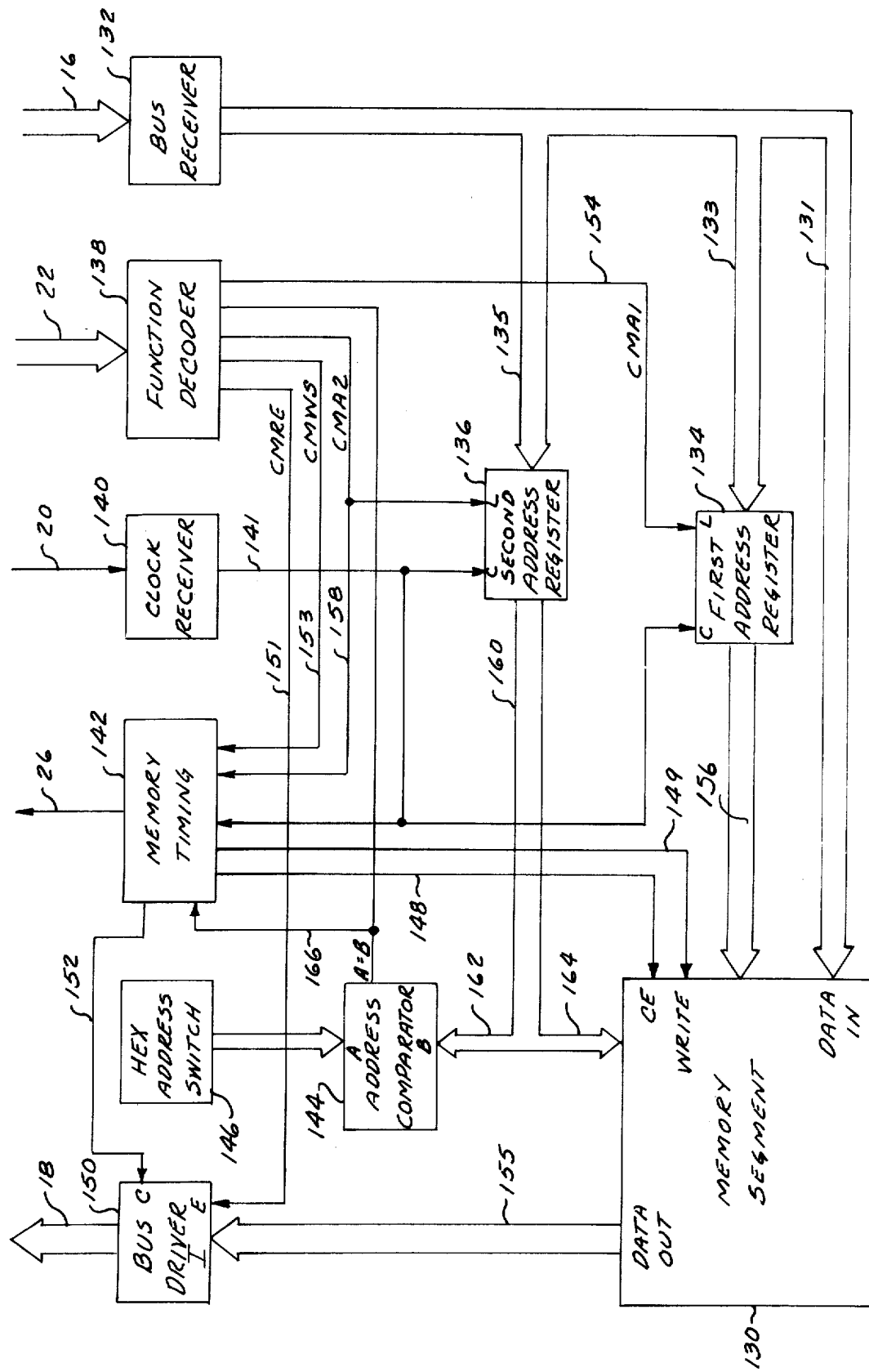
FIG. 3 is a schematic diagram of a typical memory board making up the external memory.

The preferred embodiment of this invention employs an external memory for storage of macroinstructions as well as for storage of data outputted by the central processing unit, which memory has the capability of storing up to 65,536 8 bit data words. One possible way to configure such a memory is to combine a number of memory boards each capable of storing a given number of data words, the total of which does not exceed the maximum storage capacity dictated by the number of addressing bits. FIG. 3 shows schematically one possible embodiment of such a board. This particular embodiment discloses a read/write memory (RWM) board having a memory segment 130 which is capable of storing 4096 8 bit binary data words, thus up to 16 such memory boards could be combined giving a total allowable memory storage capacity of 65,536 8 bit binary data words. As was hereinabove described, such a memory capacity requires a 16 bit address. Referring to FIG. 3, addressing information and data to be stored by the RWM is sent thereto from the central processing unit by way of the output data bus 16. The output data bus 16 is connected to bus receiver 132 which serves to electrically interface the signals received on the output data bus with the requirements of other circuit elements on the read/write memory board. The bus receiver 132 output is connected to the memory segment via line 131, to the first address register 134 via line 133, and to the second address register 136 via line 135. In order to address a word location in the read/write memory the eight least significant bits of the memory address are sent out over the output data bus 16 by the central processing unit and are received by the bus receiver 132 on each memory board. Simultaneously, a coded first address command (CMA1) is sent out the central processing unit over the three bit function command bus 22 and is received by the function decoder 138 on each memory board. The function decoder is a decoding device capable of receiving a 3 bit coded binary data word, and having a plurality of single bit binary control line outputs each of which is associated with a possible input code and will become active, that is, output a logical true signal, upon receipt by the decoder of the code associated with the given output. Upon receipt of the first address command (CMA1) the function decoder will output a logical true signal in the output control line 154, labeled CMA1 connected to the first address register which will cause that register to store the eight least significant bits of the read/write memory address presented on its input. The first address register 134 is, in this preferred embodiment, an eight bit parallel in — parallel out data storage register which will store the 8 bit data word presented on its data input when it receives a clock pulse on its C-input if a load command is presented on its L-input, which in this case is connected to the CMA1 line. The first address register receives a clock pulse on its C-input from the clock receiver 140 via line 141 which receives the clock pulses generated by the central processing unit via clock line 20, thus synchronizing the elements on the memory boards with the central processing unit system clock. The eight least significant bits of the memory address stored in the first address register 134 will be transmitted to the memory segment 130 via line 156. The central processing unit will then output the eight most significant bits of the 16 bit memory address on the output data bus 16 which will be received by the bus receiver 132 on the memory boards, and the central processing unit will simultaneously send a coded second memory address command (CMA2) over the function command bus 22, which will be received by the function decoders 138 on the memory boards. The function decoders will then transmit a CMA2 command to the L-input of the second address register 136 on each of the memory boards via line 158 which will cause the second address register to store the most significant 8 bits of the 16 bit memory address upon receipt of a clock pulse by the clock receiver 140.

The CMA2 command output line 158 of the function decoder is also connected to the memory timing unit 142 which, upon receipt of the CMA2 command, will begin a sequence to determine whether the memory board contains the memory location addressed by the central processing unit, and if so to prepare the memory segment to either output the data in the addressed memory location or to write data from the central processing unit into that location. Since in this preferred embodiment of the invention the external memory is made up of a maximum of 16 memory boards of this type, each having a memory segment containing 4096 addressable storage locations, the four most significant bits of the 16 bit memory address are used to select the memory board which contains the memory location to be addressed. The remaining 12 bits of the 16 bit memory address select the location to be addressed within the memory unit on that board. Therefore, of the eight most significant bits of the 16 bit memory address stored in the second address register 136 and outputted on line 160, the four most significant bits are outputted to the address comparator 144 on line 162 and the remaining 4 bits of the address stored in the second address register are outputted to the memory segment on line 164, thus completing the 12 bit address required by it. In addition to receiving as its input the four most singificant bits of the 16 bit memory address, the address comparator 144 also receives as an input a 4 bit data word from the hexaddress switch 146 which defines the address of the given memory board. The address comparator compares the 4 bit address stored in the hexaddress switch with the four most significant bits of the 16 bit memory address, and if the two coincide indicating that the memory board contains the addressed memory location, the address comparator will so indicate by outputting a logical true signal on its single bit output line 166 labeled A = B, which is connected to the memory timing unit 142. The memory timing unit will then output a signal on the memory ready line 26 to the central processing unit indicating that the memory board containing the addressed memory location has received and interpreted the address and is preparing to receive or output data; this signal will remain on the memory ready line 26 until such time as the memory board is prepared to output data stored in the addressed location or to write data therein. The memory timing unit, having received a logical true signal from the address comparator, will also output a chip enable signal to the memory segment on output line 148, which signal will allow the memory segment to output the data stored in the addressed location to the bus driver 150 via line 155. The bus driver, in this preferred embodiment, is a parallel in - parallel out 8 bit data storage register which upon receipt of a pulse on its C input will store the data presented on its I input, and will output the data so stored when it receives an output enabling signal on its E input. After outputting the chip enable signal to the memory segment 130, the memory timing unit 142 will wait a sufficient period of time for the memory segment to respond to its 12 bit address and will then send out a pulse on line 152 causing the bus driver to store the data outputted from the addressed location. After the memory segment 130 has been addressed and the data stored in the addressed location has been stored in the bus driver 150, the memory timing unit will remove the signal it has outputted on the memory ready line thus indicating to the central processing unit that the read-write memory addressing is complete and the RWM is capable of outputting the data stored in the addressed location or writing data therein.

If data is to be read out of the addressed location in the read/write memory, the central processing unit will output, on the function command bus 22, a coded memory read command (CMRE) which will be received and decoded by the function decoder 138; the function decoder will then send out a control signal on its CMRE output line 151, which is connected to the enabling input of the bus driver, thus commanding the bus driver to output the data stored therein on the input data bus 18, which data was previously read out from the addressed location in the memory segment 130. This data will then be received by the B-mux 52 (FIG. 2) and passed to the ALU 40 (FIG. 2) to be operated on thereby.

If data is to be written into the addressed memory location the data will be transmitted to the read/write memory by way of output data bus 16 and will be received by the bus receiver 132 and presented to the memory segment via bus 131. Simultaneously, the central processing unit will send out a coded memory write command (CMWS) which will be received by the function decoder 138 causing the function decoder to output a signal on its CMWS output line 153 to the memory timing unit 142 to start a memory write cycle controlled thereby. The memory timing unit will then output, on the memory ready line 26, a signal to the central processing unit indicating that the memory is writing data received from the central processing unit into the addressed memory location, and the central processing unit will continue to output that data until such time as this signal is removed from the memory ready line 26. Also, the memory timing unit will output, over output line 149, a write enable signal which enables the data presented on the data-in input to the memory segment to be written into the addressed memory location.

INTERRUPT OPERATION

In the preferred embodiment of this invention the central processing unit has a multiple priority level interrupt feature. In the normal operation, a data processing system may be used to control myriad external devices connected to the input-output ports. Typically, the various external devices connected to such a microprocessor system have differing real time requirements for control information and for inputting and outputting data dictated by the occurrence of certain events external to the processor. In order to respond to a given external event, the central processing unit must execute a group of macroinstructions stored in the external memory, commonly called an interrupt service routine. To insure proper servicing of the external devices, each of the macroinstruction interrupt service routines is assigned one of a number of priority levels, the routines for servicing those external devices which require rapid processor response being assigned higher priority levels and the routines for those external devices with less critical requirements being assigned lower priority levels. To allow rapid response to external events, the processor has an interrupt system allowing external devices to interrupt the currently active macroinstruction routine, and cause immediate execution of the appropriate macroinstruction interrupt service routine. When interrupt service is completed, the processor resumes execution of the originally active macroinstruction routine. The central processing unit is designed with the capability of recognizing an interrupt request, and the priority level thereof, and additionally allowing an interrupt service routine being executed to be interrupted when an interrupt request of a higher priority level is recognized. The central processing unit then proceeds to execute the higher priority level interrupt service routine for servicing the higher priority external device after which it resumes executing the lower priority level routine which was interrupted.

Referring to FIG. 2, there is shown bus 56 containing seven interrupt request lines inputted to the B multiplexer 52, corresponding to external priority interrupt requests of seven different priority levels. An eighth line, also included in bus 56, corresponds to an external command to halt CPU operation. In this preferred embodiment, these eight lines are arranged in such a manner as to input to the central processing unit an eight bit binary data word in which the most significant bit corresponds to the interrupt request line of the highest priority, the second most significant bit corresponds to the interrupt request line of the second highest priority, and so on, with the least significant corresponding to the interrupt request line representing a halt command. Although the halt command is assigned the lowest priority position, as will be shown hereinafter, the halt command will halt the execution of a macroinstruction routine regardless of its priority level. The halt command is typically employed to inhibit execution of macroinstructions and to cause the CPU to execute a special microinstruction routine for servicing a diagnostic panel to allow the programmer to examine and change various registers and memory locations.

In the preferred embodiment of this invention, the execution of a macroinstruction routine of a given priority level may only be interrupted by interrupt requests of a higher priority level. Additionally, the macroprogrammer, by way of macroprogram instructions, may designate priority levels for which external priority interrupt requests shall and shall not be enabled in any event. This feature is effected by storing, in the A file 86, an eight bit binary data word determined by the macroinstructions and termed an interrupt mask, which contains logical zeros in the bit positions corresponding to those priority interrupt levels for which interrupts shall be enabled and logical ones in all other bit positions. The A file register in which the interrupt mask is stored is termed the interrupt mask register (INM register) 200 and is selected by the microinstructions. Two other registers in the A file selected by the microinstructions are important to the interrupt feature of this embodiment, an active level register (ALR) 202 and an interrupt test mask (ITM) register 204. The active level register stores an eight bit binary data word indicative of active priority levels; active levels are defined as the priority level in which the CPU is presently operating and any lower priority levels in which routines previously being executed were interrupted prior to completion, to which level or levels the central processing unit must return upon completion of the routine at the next higher active level. In this preferred embodiment, the active level register contains logical zeros in those bit positions associated with active priority levels and logical ones in all other bit positions. The interrupt test mask register 204 contains an eight bit binary data word having logical zeros in those bit positions associated with interrupt priority levels which are both higher in priority than the level in which the CPU is operating and designated by the interrupt mask as priority levels for which interrupts will be allowed; the ITM register also contains a logical zero at the lowest priority level bit position, which bit position is associated with the external halt command. The eight bit binary data word stored in the interrupt test mask register is termed an interrupt test mask (ITM) and is indicative of those interrupt priority levels for which interrupt requests will be allowed at any given time. There is no hardware distinction setting apart the three registers just described. They are general registers in the A-file. Their special application to the interrupt system is determined entirely by the microinstruction routines which implement the various functions of the interrupt system.

Figure 4:
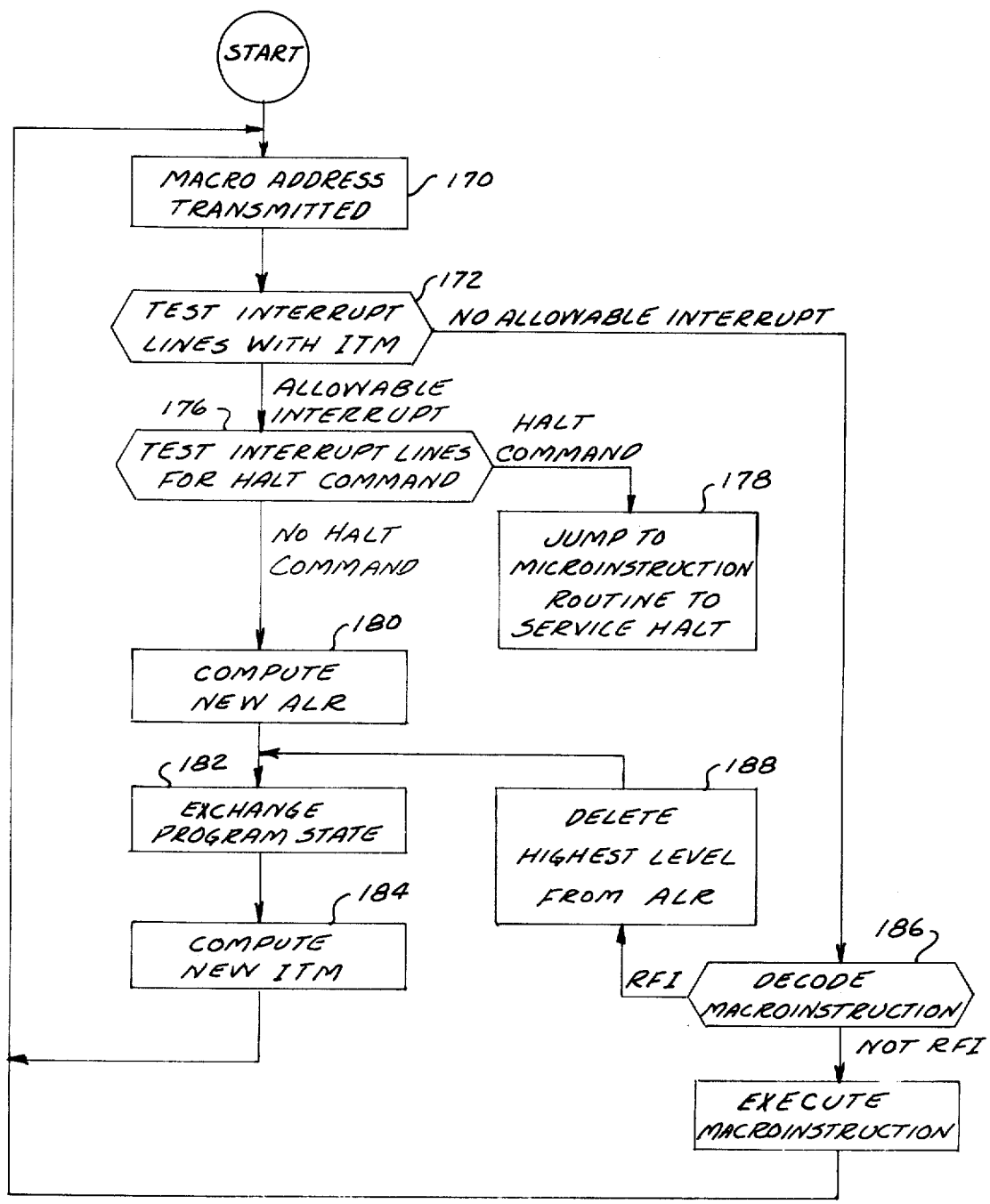
FIG. 4 is a flow chart which describes the operation of the priority interrupt system in the preferred embodiment.

Referring to Fig. 4, there is shown a flow chart describing generally the operation of the priority interrupt feature of the preferred embodiment of this invention. In order to fetch a given macroinstruction, the CPU must send the address of the macroinstruction to the external memory and wait until such time as the memory indicates, by way of the memory ready line 26 (FIG. 2), that addressing is complete and the memory is prepared to transmit the macroinstruction stored in the addressed memory location. Each time a macroinstruction address is transmitted the central processing unit will test the interrupt lines 56 (FIG. 2) for the existence of an allowable interrupt request while waiting to receive an indication that the external memory is ready to transmit the addressed macroinstruction. After such an address has been transmitted per block 170 (FIG. 4) the test indicated by block 172, labeled "test interrupt lines with ITM", will be made. This involves logically comparing the signals on the interrupt request lines with the interrupt test mask stored in the A file. If no interrupt request is present on the interrupt request lines, or if an interrupt request is present but is of a priority level for which interrupts are not allowable as determined by the interrupt test mask, the system will proceed to read and execute the macroinstructions stored in the read/write memory and the interrupt request lines will again be examined when the next macroinstruction is addressed. However, if an interrupt request of an allowable priority level is present when the interrupt request lines are examined, the central processing unit will jump to a microinstruction routine for servicing interrupt requests, shown in blocks 176, 180, 182, and 184 in FIG. 4, this routine being termed the interrupt routine. The first step of the interrupt routine, block 176, is to determine whether the interrupt request is one of the seven priority interrupt requests or a halt command, this test is described in block 176 labeled "test interrupt lines for halt command". If the interrupt request is a halt command, the central processing unit will jump to yet another microinstruction routine for servicing a halt command, as described by block 178, but if the interrupt request was not a halt command the microprocessor will continue to execute instructions in the interrupt routine.

The balance of the instructions making up the interrupt routine include instructions for accomplishing the tasks described in blocks 180, 182, and 184 of FIG. 4. First, the active level register must be updated to reflect the fact that the central processing unit, as a result of being interrupted, will be operating in a higher priority level, that is, the priority level of the interrupt request being serviced must now appear as an active level in the ALR. Second, the program state of the interrupted macroinstruction routine (i.e., information contained in the macroprogram counter registers 210 and 212, macro accumulator register 206, the macro carry register 208, and various other registers used by the macroinstruction routine) must be saved. This information, normally residing in the A and B files, must be stored elsewhere (block 182, FIG. 4) later to be returned to the A and B files to be used in completion of the interrupted macroinstruction routine. Additionally, the program state, necessary for executing the macroinstruction routine associated with the interrupt request, must be loaded into the A and B files. In order to accomplish this, the external memory contains seven designated save areas, associated with the seven respective interrupt priority levels and an eighth associated with the base level, each having sufficient capacity to store the information comprising the program state, the base level being defined as the lowest priority level, always active, and the level to which the system returns upon completion of all macroinstruction interrupt service routines. The save area associated with the priority level of the interrupt request being serviced contains the program state necessary to begin executing the macroinstruction routine associated with that interrupt request. The program state associated with the interrupted macroinstruction routine will be stored in the save area associated with the priority level of that routine. Therefore, following the microinstructions for updating the active level register, the interrupt routine contains microinstructions necessary for storing the program state of the interrupted macroinstruction routine in the appropriate save area and loading the program state corresponding to the priority level of the interrupt request into the A and B files. The final task which must be completed by the interrupt routine prior to beginning execution of the new macroinstruction routine is to compute a new interrupt test mask reflecting the fact that only external priority interrupts of a higher priority than the priority level in which the central processing unit is now operating will be allowed, block 184, FIG. 4. Consequently, there are instructions in the interrupt routine for updating the contents of the interrupt test mask register to only allow such higher priority external interrupt requests.

The central processing unit will now begin to execute the macroinstructions making up the new macroinstrcution routine. Since the new macroinstruction routine may be interrupted by yet higher priority level interrupt requests, the test shown in block 172 will be carried out after the address of each macroinstruction in the new macroinstruction routine is transmitted. In the event the test in block 172 discloses an allowable interrupt, the system will again execute the interrupt routine in the same manner as when the previous macroinstruction routine was interrupted.

In the event no allowable interrupt request is present after the transmission of a given macroinstruction address, the macroinstruction will be executed, the macroprogram counter will be incremented, and the next macroinstruction will be fetched and executed until such time as a macroinstruction entitled "return from interrupt" (RFI) is read into the central processing unit. When such macroinstruction is decoded (block 186, FIG. 4) the CPU will jump to a microinstruction routine (block 188) for revising the contents of the active level register to delete the highest active priority level (i.e., the priority level of the macroinstruction routine containing the RFI macroinstruction). The next highest active level now becomes the operating priority level. The central processing unit then jumps to those microinstructions in the interrupt routine which cause the program state associated with the macroinstruction routine just completed, to be stored in the appropriate external memory save area and the program state associated with the new operating priority level to be loaded into the A and B files from the save area into which it was previously stored. The new program state will be that of the previously interrupted macroinstruction routine, which will now continue, essentially unaffected by the interrupt process, except for time elapsed. The final task (block 184) to be completed is to recompute the interrupt test mask to reflect the fact that the system is now operating at the next lower active priority level and may, therefore, be interrupted by any allowable higher priority level interrupt requests.

Referring now to FIG. 2 in conjunction with FIG. 4, a more detailed description of the interrupt feature of this preferred embodiment will be disclosed. As was described above, two eight bit registers 210 and 212, in the A file 86 are designated by the microinstructions to store the 16 bit address of the macroinstruction presently being executed by the central processing unit. First program counter register 210 which stores the eight least significant bits of the 16 bit read/write memory address is termed the lower program counter (PCL) register and second program counter register 212 which stores the eight most significant bits of the 16 bit read/write memory address is termed the upper program counter (PCU) register.

Upon completion of a given macroinstruction the next macroinstruction in the routine will be addressed in the following manner. A first microinstruction will be addressed in ROM 30 which causes it to output control signals that perform the following functions: address via lines 88 and 90 PCL register 210 in A file 86, cause the A-mux latch 84 to output the contents of the PCL register to the A operand input of the ALU 40 via lines 81 and 41, cause the C-mux 118 to output a logical one to the carry input of the ALU 40 via line 50, thereby incrementing by one the contents of PCL register (depending upon the type of ALU used, a number might be incremented by forcing a logic one on the carry input to the ALU or the ALU might be commanded by control line 42 to increment the binary number inputted thereto); cause the A file to store, in the addressed PCL register, the result outputted on ALU output line 44 and output data bus 16; via lines 88, 194, and 120 cause the CFB driver 92 to output a CMA1 command on the function command bus; via the signal on line 82 cause the file address register 68 not to store the output of the ALU 40; and via the signal on line 114 cause the p-mux 98 to output none of the signals on its inputs to the program counter 32, thereby maintaining the program counter in the incremental mode of operation. The PC 32 will then be incremented to address the next microinstruction during the next clock cycle, which microinstruction will cause the ROM to output a second set of control signals which address the PCU register 212 in the A file; command the A-mux latch 86 to output the contents of the PCU register to the A operand input of the ALU via lines 81 and 41; command the C-multiplexer 118 to output via line 50 the logical sense of the carry bit which resulted from incrementing the contents of the PCL register and was outputted by ALU 40 on line 48 and stored in the status register 36 during the previous clock cycle; command the ALU 40 to combine the contents of the PCU 212 with the carry bit outputted by the C-mux 118 and output the result on line 44 to output data bus 16; command the A file to store the result in PCU register 212; and command the CFB driver 92 to output a CMA2 command on the function command bus 22; commands to other elements of the central processing unit will be the same as they were during execution of the previous microinstruction.

Upon completion of the second microinstruction the transmission of the macroinstruction address is complete and the macroinstruction program counters PCL 210 and PCU 212 reflect the address of the new macroinstruction to be received and executed.

During the next clock cycle, the program counter 32 will be incremented and the next microinstruction will be addressed causing control signals to be outputted by the ROM for testing the interrupt request lines 56. These control signals will command the B multiplexer 52 to output the data present on the interrupt request lines 56 to the B operand input of the ALU 40; address the interrupt test mask register 204 in the A file 86, command the A-mux latch 84 to output the contents of the interrupt test mask register 204 to the A operand input of the ALU 40, command the ALU 40 to logically OR its A and B operand inputs and output the result on line 44, command the file address register 68 to store the result, command the P-mux 98 to maintain the PC 32 in the incremental mode, command the C-mux 118 to output a logic zero to the carry input of the ALU and command the CFB driver 92 to output no function on the function command bus 22. Since only an interrupt request line connected to a device requesting an interrupt will have a logic zero signal thereon, and since the interrupt test mask contains logic zero signals only in those bit positions corresponding to interrupt priority levels which are allowable at the time of execution of this microinstruction, the result of logically ORing the interrupt request lines with the interrupt test mask will be a hexadecimal FF, i.e., all logic ones, if no interrupt request is present or if an interrupt request is present which was not allowable as determined by the interrupt test mask; and will consist of an 8 bit binary data word with a logical zero only in the bit position(s) associated with the interrupt request if an allowable interrupt request is present on the interrupt request lines. As a result, during this clock cycle, the ALU will output on line 46 a logic one if no allowable interrupt request was present and a logical zero if an allowable interrupt was present, which output will be stored in the status register 36, and outputted thereby on line 99 to the B input of the P-mux 98 during the next clock cycle. The PC 32 will then be incremented and the next microinstruction will be addressed in the ROM and control signals outputted thereby, which will output to the A-mux latch 84 via line 88 the address of the first microinstruction in the interrupt routine, command the A-mux latch to output that address to the PC 32 via line 112, and command the P - mux to output the data presented on its B input to the PC 32 via line 110. The result of the execution of this microinstruction is a conditional jump to the interrupt routine if an allowable interrupt request was present on the interrupt request lines, i.e., the P-mux outputs the signal on its B input which was outputted by the ALU on line 46 and stored in the status register 36 during the previous clock cycle. This signal is indicative of whether or not an allowable interrupt request was present, i.e., a logic zero if an allowable interrupt request is present and a logic one if no allowable interrupt request is present. This logic zero or one is passed to the PC 32 via line 112 and if it is a logic one (no allowable interrupt present) it will maintain the PC 32 in the incremental mode, but if it is a logic zero (an allowable interrupt present) it will cause the PC 32 to change to the specific address mode and load the address of the first microinstruction in the interrupt routine outputted by the ROM on line 88.

As is described in block 176 of FIG. 4, the first task of the interrupt routine is to determine whether the allowable interrupt request is one of the seven external priority interrupt requests or a halt command. Therefore, the first instruction in the interrupt routine will cause a hexadecimal FE to be outputted on the eight bit ROM output 88, i.e., an 8 bit data word containing a logical zero in the least significant bit position and logical ones in all other bit positions and will output control signals on the other ROM output lines which command the A-mux latch 84 to output the hexadecimal FE inputted thereto; command the B-mux latch 58 and B-mux 52 to pass the contents of the file address register to the ALU, and command the ALU 40 to logically OR its A and B operand inputs. Since the contents of the file address register 68 is an 8 bit data word with a binary zero in the bit position(s) associated with the allowable interrupt request(s) present on the interrupt request lines, and logical ones in all other bit positions, and since the least significant bit position is associated with a halt command, the result of logically ORing the contents of the file address register with a hexadecimal FE will be a hexadecimal FF if no halt command is present and will be a hexadecimal FE if a halt command is present causing the ALU to output on line 46, for storage in the status register, a logical one or a logical zero respectively. The PC 32 will then be incremented to the address of the next microinstruction, which will cause the address of a microinstruction routine for servicing a halt command to be outputted on ROM output line 88 and cause control signals to be outputted which will command the A-mux latch 84 to output this address to the PC 32 via line 112, and will command the P-mux 98 to output to the PC 32 via line 110 the result previously outputted by the ALU on line 46 and stored in the status register. The signal outputted by the ALU 40 on line 46 and stored in the status register 36 during execution of the previous microinstruction is passed to the P-mux via line 99 and from there to the PC 32 via line 110. If this signal is a logical zero, indicating that a halt command was present, the PC 32 will be actuated from its first mode of operation to its second mode of operation (i.e., from the incremental mode to the specific address mode) thus causing the address of the first microinstruction of the routine for servicing a halt command to be loaded therein. If this signal is a logical one, indicating no halt command was present, the PC 32 will remain in the incremental mode and continue executing microinstructions in the interrupt routine.

Assuming that the interrupt was not a halt command, since the macroprogram counter has been incremented to the next macroinstruction and since due to the interrupt this macroinstruction will not be executed, the macroprogram counter must be decremented by one to restore its correct value. Therefore, the next two microinstructions will respectively output control signals for addressing, decrementing, and restoring the macroinstruction address stored in the PCL 210 and PCU 212 registers in the A file.

After decrementing the macroprogram counter, the tasks described in blocks 180, 182, and 184 of FIG. 4 must be completed. The first task is to update the active level register (ALR) 202 to mark the interrupting priority level(s) active. To accomplish this the next successive microinstruction is addressed in the read only memory causing the ROM to output control signals which address ALR 202 via lines 88 and 90; command the A-mux latch to output the contents of ALR 202 to A input of ALU 40 via line 41; command the B-mux latch 58 and the B-mux 52 to pass the contents of the file address register to the B input of the ALU 40, which contents consist of an eight bit binary data word with logical zeros in the bit position(s) associated with the priority level of the allowable interrupt request(s) received; command the ALU 40 to logically AND its A and B operand inputs and output the result on line 44; and command the file address register and active level register to store the result outputted by the ALU. This result will consist of an eight bit binary data word having logical zeros in all bit positions previously designated as being active levels by the active level register plus a logical zero in the bit position(s) associated with the priority level(s) of the interrupt request(s) received.

The next task to be completed is that of storing the program state contained in the B file registers and the appropriate A file registers into the external memory register save area associated with the priority level of the macroinstruction routine being interrupted, and loading in these A and B file registers the program state stored in the external memory register save area associated with the new highest active priority level. In order to achieve this, the interrupt routine used in the preferred embodiment of this invention contains a group of microinstructions for exchanging the information in the B file registers and another group of microinstructions for exchanging the data stored in the appropriate A file registers. The group of microinstructions for exchanging the information stored in the B file contains a first microinstruction which causes the read only memory to output the necessary control signals for loading a hexadecimal FO in the file address register 68. The file address register outputs associated with the four least significant bits of the eight bit binary number contained therein are used to address the B file; therefore, a hexadecimal FO stored in the file address register will cause the first register of the B file to be addressed. The next microinstruction in this group will create control signals which cause its read only memory address to be stored in an unused A file register and cause the central processing unit to jump to a microinstruction sub-routine for exchanging the information contained in one file register with information stored in the appropriate external memory save area. This sub-routine contains microinstructions which cause the read only memory to output the necessary control signals to do the following: address the appropriate storage location in the external memory register save area associated with the priority level of the macroinstruction routine being interrupted; output on the output data bus the information stored in the addressed register in the B file and simultaneously output on the function command bus CFB 22, a memory write command (CMWS) thereby causing this information to be stored in the addressed external location. Next, the microinstructions will cause the ROM to output control signals to address the first storage location in the external memory register save area associated with the priority level of the interrupt request being serviced; output the function command bus a memory read command (CMRE) and necessary commands internal to the CPU for receiving the information stored in the addressed external memory location and storing that information in the addressed first register of the B file. The remaining microinstructions in this sub-routine will cause control signals to be outputted by the read only memory which retrieve the interrupt routine microinstruction return address previously stored in an A file register, increment that address by one (thereby creating the address of the microinstruction immediately following the interrupt routine microinstruction last executed) and cause the central processing unit to jump back to this microinstruction address. This microinstruction will increment the binary number stored in the file address register (FAR) 68 by one, thereby addressing the next B file register. The next microinstruction executed by the CPU tests to determine whether the information stored in all the B file registers has been exchanged. The arithmetic operation of incrementing the file address register contents by one is carried out by the arithmetic logic unit. Due to the fact that a hexadecimal FO was initially stored in the file address register a logical one carry bit will be outputted by the ALU when the address of the last of the sixteen B file registers is incremented by one. Therefore, this microinstruction is a conditional jump instruction for causing the ROM to output control signals which will cause the central processing unit to conditionally jump to another group of microinstructions in the interrupt routine (for exchanging the information stored in the appropriate A file registers), the jump being conditioned upon whether a logical one carry bit is outputted by the ALU when the contents of the FAR 68 are incremented by one. If no jump occurs when there remains B file information not yet exchanged, and the CPU will move on sequentially to the next microinstruction which will create control signals causing an unconditional jump again to the microinstruction subroutine for exchanging the information in one file register. This process of executing interrupt routine microinstructions necessary to increment the B file address located in the FAR 68, testing to determine if the information in all of the B file registers has been exchanged, and jumping to the sub-routine for exchanging the information in one file register will be repeated until such time as the information in all B file registers has been stored in the external memory and replaced with other data stored therein, at which time the central processing unit will jump to the group of microinstructions for exchanging the information stored in the appropriate A file registers.

When the address stored in the FAR 68 is incremented for the last time and a logical one carry bit is recognized, the result outputted by the ALU on output line 44 and stored in the file address register is a hexadecimal 00 which causes the first register in the B file to again be addressed. The contents of the file address register are not changed during the exchange of data in the A file registers. The first microinstruction in the group of interrupt routine microinstructions for exchanging A file information causes the ROM to output control signals which address the first A file register to be exchanged and cause the contents of that register to be passed through the A-mux latch 84 and the ALU 40 unchanged and stored in the addressed first register in the B file. The second microinstruction in this group creates control signals which cause its read only memory address to be stored in an unused A file register and cause the central processing unit to jump to the microinstruction sub-routine for exchanging the information in one file register. This sub-routine will be executed as it was during the exchange of information stored in the B file registers, returning to the next microinstruction in the interrupt routine, which will cause the new contents of the first B file register to be transferred into the A file register being exchanged. The following microinstruction will cause the read only memory to output control signals which address the second A file register to be exchanged and cause the data stored therein to be outputted, passed through the A-mux latch 84 and ALU 40 unchanged, and stored in the addressed first register of the B-file; succeeding microinstructions will then cause the read only memory to output control signals which cause the central processing unit to again jump to the microinstruction sub-routine for exchanging the information in one file register and will transfer the new data into the second register to be exchanged. This process will be repeated until such time as the information contained in all the appropriate A file registers has been stored in the external memory save area associated with the priority level of the macroinstruction routine being interrupted and replaced with information stored in the external memory register save area associated with the priority level of the interrupt request being serviced.

The remaining task to be carried out by the interrupt routine is to update the contents of the interrupt test mask (ITM) register 204 to reflect the fact that the central processing unit will be operating in a new priority level. This is accomplished by generating an 8 bit binary number which contains logical zeros in all bit positions associated with priority levels higher than the priority level of the interrupt request being serviced and logical ones in all other bit positions, and logically ORing this 8 bit binary number with the 8 bit interrupt mask (INM) stored in the interrupt mask register 200. The result of this logical operation is an eight bit binary number having logical zeros in those bit positions which are both of a higher priority level than the priority level of the interrupt request being serviced and designated by the interrupt mask as being priority levels for which interrupts will be enabled. Since a halt command will be enabled regardless of the priority level in which the system is operating, the least significant bit position, which position is associated with a halt command, must contain a logical zero; therefore, the result of the previous logical ORing operation is logically ANDed with a hexadecimal FE and the result of this operation is the new interrupt test mask which is then stored in the interrupt test mask register 204.

In the preferred embodiment the eight bit binary number having logical zeros in all bit positions associated with priority levels which are higher than the priority level of the interrupt request being serviced, and logical ones in all other bit positions is generated in the following manner. The first of a group of microinstructions in the interrupt routine generates control signals which cause the contents of the ALR 202 to be loaded into a temporary storage register in the A file. This microinstruction is followed by a microinstruction which generates control signals for causing a hexadecimal FF to be loaded into a current program level (CPL) register 205 in the A file, designated by the microinstruction. The A file temporary storage register discussed herein may be any otherwise unused A file register chosen by the microinstructions. A subsequent microinstruction causes the contents of the CPL register 205 in the A file to be inputted to the ALU, shifted to the left by one, while forcing a logic zero into the register at the right, and restored in the CPL register 205; i.e., the data in each bit position in the register is shifted to the next most significant bit position and a logical zero is placed in the least significant bit position of the register. This microinstruction is followed by a microinstruction which generates control signals for causing the contents of the temporary storage register in the A file to be similarly shifted to the left by one. The next microinstruction in the sequence is a condition jump instruction which causes the central processing unit to execute a conditional jump if a logical one bit was outputted by the arithmetic logic unit during the execution of the previous microinstruction; the central processing unit will jump to the address of the microinstruction which causes the contents of the CPL register 205 in the A file to be shifted to the left by one. Thus, these three microinstructions will be repeated until such time as the logical zero corresponding to the highest active level reaches the most significant bit position of the temporary storage register in the A file, at which time no conditional jump will occur. The central processing unit will then execute subsequent microinstuctions in the interrupt routine which cause the contents of the CPL register 205 in the A file to be once again shifted to the left by one, this time inputting a logical one to the register at the right. These microinstructions will be repeated until such time as a logical zero is recognized in the most significant bit position of the CPL register. When a logical zero appears in the most significant bit position of the CPL register a binary number has been generated containing logical zeros in the bit position associated with the priority level of the interrupt request being serviced and all higher priority levels and logical ones in all other bit positions.

The CPU will then execute a group of microinstructions in the interrupt service routine for updating the interrupt test mask which will cause the ROM to output control signals for shifting the binary number stored in the CPL register to the left by one and for utilizing the result as described above for updating the interrupt test mask.

Updating the interrupt test mask marks completion of the interrupt routine, thus enabling the system to execute the macroinstructions making up the macroinstruction routine associated with the priority level of the interrupt request to be serviced. The last microinstruction in the interrupt routine is an unconditional jump instruction which causes the PC 32 to be loaded with the address of the first microinstruction of the microinstruction routine for addressing and fetching macroinstructions from the external memory. Due to the exchanging of A and B file information as described above, the PCL and PCU registers in the A file now contain information necessary for addressing the first macroinstruction of the macroinstruction routine now to be executed. Macroinstructions making up this routine will be executed by the central processing unit until the macroinstruction the macroinstruction routine is either interrupted by a high priority level interrupt request, or a halt command, or a return from interrupt macroinstruction is received by the central processing unit which causes the central processing unit to jump to a macroinstruction routine having the necessary microinstructions to cause the system to resume operation in the next lower active priority level, i.e., resume executing the macroinstructions in the highest priority level macroinstruction routine previously interrupted.

The microinstruction routine for executing a return from interrupt basically repeats the steps carried out during the interrupt service routine. First, it updates the information stored in the active level register to delete the highest active level, then it causes the central processing unit to jump to the group fo microinstructions in the interrupt routine which cause the information stored in the B file registers and the appropriate A file registers to be exchanged with information stored in the appropriate external memory register save areas, and causes the interrupt test mask to be recomputed to reflect the fact that the central processing unit is now operating in a lower priority level.

The first microinstruction in the return from interrupt routine generates control signals which address the CPL register 205 in the A file; cause the information stored therein to be passed by the A-mux latch 84 to the ALU 40 via line 41 and incremented by one therein; and cause the result outputted by the ALU 40 to be stored in the FAR 68. Since the CPL register 205 contained an eight bit binary data word having a logical zero at the bit position associated with the priority level of the macroinstruction routine just executed, as well as logical zeros in all bit positions associated with higher priority levels, and logical ones in all bit positions associated with lower priority levels, incrementing this binary word by one creates an 8 bit data word having a logical one at the bit position associated with the priority level of the macroinstruction routine just executed and logical zeros in all other bit positions. The next microinstruction in the return from interrupt routine generates control signals which address the ALR 202 in the A file; cause the data stored therein to be passed through the A-mux latch 84 to the A operand input of the arithmetic logic unit via line 41; cause the B-mux 56 and B-mux 58 to pass the information stored in the file address register to the B operand input of the arithmetic logic unit via lines 59 and 61; cause the arithmetic logic unit to logically OR the data presented on its A and B operand inputs and cause the result outputted by the arithmetic logic unit on output line 44 to be stored in the ALR in the A file. Logically ORing the contents of the active level register with the binary number resulting from incrementing the contents of the current level register by one causes the logical zero in the active level register bit position associated with the priority level of the macroinstruction routine just executed to be changed to a logical one, thus reflecting the fact that this priority level is no longer active and the central processing unit is now operating in the next lower active level. A subsequent return from interrupt routine microinstruction will cause the central processing unit to jump unconditionally to the first microinstruction in the group of interrupt service routine microinstructions for exchanging the information contained in the B file registers and the appropriate A file registers with information stored in the appropriate external memory register save area. The information in the A and B file registers will be stored in the external memory save area associated with the priority level of the macroinstruction routine just executed and the information stored in the external memory register save area associated with the now active priority level will be loaded into the B file registers and the appropriate A file registers. The interrupt routine microinstructions for updating the contents of the interrupt test mask register will then be executed after which the system will unconditionally jump to the microinstruction sub-routine for fetching and executing the macroinstructions making up the macroinstruction routine associated with the new highest active priority level.

What is claimed is:

1. A data processing system including a central processing unit and external memory, said central processing unit comprising:

an arithmetic logic unit having first and second inputs for receiving input data and an output for carrying output data therefrom;

a first group of registers and a second group of registers each having an input connected to said arithmetic logic unit output for receiving and storing data therefrom and an output for outputting stored data;

means for selectively connecting the output of one of said registers of said first group to said first input only and for connecting the output of one of said registers of said second group with said second input only of said arithmetic logic unit;

a read only memory, said memory having a plurality of addressable word locations each storing a control instruction, and having a plurality of outputs for supplying control signals in dependence upon the addressed word location;

first means for carrying signals outputted from said arithmetic logic unit and adapted to be applied to said external memory for addressing said external memory and for storing therein data outputted from said arithmetic logic unit;

second addressing means, independent of said first means, for addressing one of said word locations of said read only memory so as to output control signals therefrom, said second addressing means having a first operating mode for incrementally addressing said word locations in a predetermined sequence, and a second actuatable operating mode for addressing a selected one of said word locations in dependence upon the data outputted from said arithmetic logic unit;

and mode control means for actuating said second addressing means from said first mode to said second mode in dependence upon the instructions represented by control signals supplied from given ones of said read only memory outputs.

2. A data processing system as set forth in claim 1, wherein said second addressing means includes data input means for receiving data during its second operating mode, and said selective connecting means includes directing means for selectively directing data outputted from said arithmetic logic unit or from said read only memory to said data input means under control said read only memory outputted control signals.

3. A data processing system as set forth in claim 1 wherein:

said first group of registers is responsive to control signals from given ones of said plurality of outputs of the read only memory for addressing a selected register thereof;

said first group of registers being responsive to control signals from given ones of said plurality of outputs of the read only memory for writing data outputted by said arithmetic logic unit into an addressed register of said first group;

said selective connecting means being responsive to control signals from given ones of said plurality of outputs of the read only memory for connecting the output of an addressed register of said first group to the first input of said arithmetic logic unit;

said first group of registers including a first program counter register and a second program counter register for storing a multibit pattern of binary digits representative of one of a plurality of addressable word locations in said external memory, said external memory having a first external memory address register for storing the least significant binary digits of said multibit pattern of binary digits, said external memory having a second external memory address register for storing the most significant digits of said multibit pattern of binary digits.

4. A data processing system as set forth in claim 3 wherein said first means for carrying signals to said exteral memory comprises:
  an output data bus connected to the output of said arithmetic logic unit and to said external memory;
  a command function bus driver having and input connected to given ones of said read only memory outputs containing binary coded function commands and an output for outputting said function commands therefrom, said command function bus driver being responsive to signals outputted from said read only memory; and a command function bus connected to said driver output and to said external memory.

5. A data processing system as set forth in claim 4 wherein said external memory comprises:
  a function decoding means with an input connected to said command function bus, and a plurality of outputs each corresponding to a given one of said function commands;
  a first address register having an input connected to said output data bus and an output for outputting data stored therein, said first address register being responsive to a control signal outputted by said function decoding means for receiving and storing a first address presented on said output data bus; a second address register having an input connected to said output data bus and an output for outputting data stored therein, said second address register being responsive to a control signal outputted by said function decoding means for receiving a second address presented on said output data bus;
  a memory segment having a plurality of addressable word locations and having a first input connected to the output of said first address register, a second input connected to the output of said second address register, and a third input connected to said output data bus for receiving and storing data presented thereon and an output for outputting data stored in an addressed word location determined by said first and second inputs, said memory segment being controlled by said function decoding means to stored in an addressed word location the data presented on said third input, upon receipt of a write command by said function decoding means, and means to output the data stored in an addressed word location upon receipt of a read command by said function decoding means.

6. A data processing system as set forth in claim 5 wherein said arithmetic logic unit has a carry output independent of said data output for outputting a binary carry bit resulting from arithmetic operations carried out by said arithmetic logic unit and a carry input independent of said first and second arithmetic logic unit inputs for inputting a binary carry bit to be arithmetically added to the binary number outputted by said arithmetic logic unit, and further comprising means for storing said binary carry bit outputted from said arithmetic logic unit and for outputting the bit to said carry input, and wherein said control instructions stored in said plurality of addressable word locations in said read only memory includes a plurality of groups of control instructions, said groups having control instructions arranged in a predetermined sequence for supplying a predetermined sequence of control signals on said read only memory outputs when said second addressing means is operated in said first mode, said groups of control instruction including a group of instructions having a first instruction for addressing said first program counter register and causing said read only memory to output signal control signals for commanding:
  said selective connecting means to pass the data outputted by said first program counter register to the first input of said arithmetic logic unit,
  said arithmetic logic unit to arithmetically increment by one the said data received from said first program counter register and output the result on the data output and carry output,
  said first program counter register to store said arithmetic logic data output,
  said carry bit storing means to store said binary carry bit,
  said command function bus driver to output a first address command for storing said arithmetic logic unit output in said first address register; and
  a second instruction for addressing said second program counter register and causing said read only memory to output control signals for commanding:
  said selective connecting means to pass the data outputted by said second program counter register to the first input of said arithmetic logic unit,
  said means for storing said carry bit to output the binary carry bit resulting from said arithmetic incrementation of the data stored in said first program counter register,
  said arithmetic logic unit to arithmetically add said carry bit to the data inputted on said first input of said arithmetic logic unit and output the result,
  said first group of registers to store said output of said arithmetic logic unit in said second program counter register,
  said function bus driver to output a second address command for storing the data outputted from said arithmetic logic unit in said second address register in said external memory.

7. A data processing system including a central processing unit and external memory, said central processing unit comprising:
  an arithmetic logic unit having first and second inputs for receiving input data and an output for carrying output data therefrom;
  a first group of registers and a second group of registers each having an input connected to said arithmetic logic unit output for receiving and storing data therefrom and an output for outputting stored data;
  means for selectively connecting the output of one of said registers to said first input and for connecting the output of a second one of said registers with said second input of said arithmetic logic unit;
  a read only memory, said memory having a plurality of addressable word locations each storing a control instruction, and having a plurality of outputs for supplying control signals in dependence upon the addressed word location;
  first means for carrying signals adapted to be applied to said external memory for addressing said external memory and for storing therein data outputted from said arithmetic logic unit;

second addressing means, independent of said first means, for addressing one of said locations of said read only memory so as to output control signals therefrom, said second addressing means having a first operating mode for incrementally addressing said word locations in a predetermined sequence, and a second actuatable operating mode for addressing a selected one of said word locations in dependence upon the data outputted from said arithmetic logic unit;

mode control means for actuating said second addressing means from said first mode to said second mode in dependence upon the instructions represented by control signals supplied from given ones of said read only memory outputs; and, a file address register having an input connected to the output of said arithmetic logic unit for storing data received therefrom and having an output connected to said second group of registers for addressing a selected register of said second group in dependence upon the data received from said arithmetic logic unit.

8. A data processing system as set forth in claim 7 including multiplexing means coupled to the outputs of said second group of registers and to the output of said file address register, said multiplexing means being controlled by said read only memory outputted control signals for selectively passing data outputted from an addressed one of said registers of said second group or the data stored in said file address register, and means for applying said passed data from said multiplexing means to one of said inputs of said arithmetic logic unit.

9. A data processing system as set forth in claim 7 wherein said read only memory has given ones of said plurality of outputs connected to said first group of registers to deliver control signals for addressing a selected register of said first group, and storing in said selected register of said first group the data outputted by said arithmetic logic unit.

10. A data processing system as set forth in claim 9 including:

a first multiplexing means coupled to the output of said first group of registers and to given ones of said read only memory outputs, said first multiplexing means being responsive to control signals outputted from said read only memory for selectively outputting data received from an addressed one of said registers of said first group or the data presented on said given ones of said read only memory outputs, and having an output connected to said first input of said arithmetic logic unit and to an input of said second means for addressing one of said word locations of said read only memory;

a second multiplexing means having a plurality of inputs, including a first input coupled to the output of said second group of registers and a second input coupled to the output of said file address register, said second multiplexing means being responsive to control signals outputted from said read only memory for selectively outputting data received from one of said plurality of inputs;

and means for applying said data outputted from said second multiplexing means to said second input of said arithmetic logic unit.

11. A data processing system as set forth in claim 10 wherein said second multiplexing means comprises:

a third input adapted to be connected to an output of said external memory for receiving data outputted from an addressed location therein;

a fourth input connected to the output of said second addressing means for receiving therefrom data representative of the read only memory location being addressed by said second means, and a fifth input being connected to a plurality of single bit lines for receiving a plurality of external interrupt requests each having a different priority level and an external halt command.

12. A data processing system as set forth in claim 10 wherein said arithmetic logic unit has a second set of output lines, connected to said mode control means, said mode control means being responsive to control signals outputted from said read only memory for actuating said second addressing means from said first mode to said second mode of dependence upon data received from said second set of output lines of said arithmetic logic unit, said second addressing means having an input connected to the output of said first multiplexing means for addressing a selected one of said word locations when operated in said second mode.

13. A data processing system as set forth in claim 9 wherein said first group of registers comprises a random access memory having:

means for storing a multibit interrupt mask pattern of binary signals represesative of given ones of a plurality of external interrupt request priority levels for which interrupts can be enabled;

means for storing a multibit active level pattern of binary signals representative of active external interrupt request priority levels, which includes the levels in which said central processing unit is operating and all lower levels which have been previously interrupted and to which said central processing unit must return upon completion of its operation at the next higher active priority level;

and means for storing a multibit interrupt test mask pattern of binary signals representative of priority levels which are both of a higher priority level than the level in which said central processing unit is operating and are levels for which interrupts shall be enabled.

* * * * *